(12) United States Patent
Gatys et al.

(10) Patent No.: US 12,164,408 B2
(45) Date of Patent: Dec. 10, 2024

(54) DEVICE-USAGE PROCESSING FOR GENERATING INFERRED USER STATES

(71) Applicant: Apple Inc., Cupertino, CA (US)

(72) Inventors: Leon A. Gatys, Seattle, WA (US); Emily Fox, Seattle, WA (US); Jonas Rauber, Baden-Wurttemberg (DE)

(73) Assignee: Apple Inc., Cupertino, CA (US)

( * ) Notice: Subject to any disclaimer, the term of this patent is extended or adjusted under 35 U.S.C. 154(b) by 827 days.

(21) Appl. No.: 16/848,421

(22) Filed: Apr. 14, 2020

(65) Prior Publication Data

US 2021/0081295 A1 Mar. 18, 2021

Related U.S. Application Data

(60) Provisional application No. 62/899,598, filed on Sep. 12, 2019.

(51) Int. Cl.
*G06N 7/00* (2023.01)
*G06F 11/34* (2006.01)
*G06N 3/04* (2023.01)

(52) U.S. Cl.
CPC .......... *G06F 11/3423* (2013.01); *G06N 3/04* (2013.01); *G06N 7/00* (2013.01)

(58) Field of Classification Search
None
See application file for complete search history.

(56) References Cited

U.S. PATENT DOCUMENTS

| | | | |
|---|---|---|---|
| 2010/0332474 A1* | 12/2010 | Birdwell | G06Q 30/0185 707/E17.089 |
| 2014/0129560 A1* | 5/2014 | Grokop | G06F 16/285 707/737 |
| 2016/0037346 A1* | 2/2016 | Boettcher | H04W 12/04 455/411 |
| 2017/0162197 A1* | 6/2017 | Cohen | G10L 15/22 |
| 2018/0239637 A1 | 8/2018 | Gupta et al. | |
| 2018/0330178 A1* | 11/2018 | el Kaliouby | B60W 50/082 |
| 2019/0215247 A1 | 7/2019 | Verkasalo | |

OTHER PUBLICATIONS

Likamwa et al ("MoodScope: Building a Mood Sensor from Smartphone Usage Patterns" 2013) (Year: 2013).*

(Continued)

*Primary Examiner* — Lut Wong
(74) *Attorney, Agent, or Firm* — Kilpatrick Townsend & Stockton LLP

(57) ABSTRACT

Techniques are disclosed for controlling a device's operation based on an inferred state. More specifically, at each of a set of time points, execution of an application at an electronic device is detected. For each detected execution, an application-usage variable is determined. One or more aggregated metrics are generated based on aggregation of at least some of the application-usage variables. Based on the one or more aggregated metrics, a state identifier is identified that corresponds to an inferred state of a user of the electronic device. A device-operation identifier is retrieved that is associated with the state identifier. A device operation is performed associated with the device-operation identifier.

17 Claims, 5 Drawing Sheets

(56) References Cited

OTHER PUBLICATIONS

Application No. PCT/US2020/047152, International Preliminary Report on Patentability, Mailed On Mar. 24, 2022, 9 pages.

Anonymous Author(s), "Modeling Patterns of Smartphone Usage and Their Relationship To Cognitive Health." Submitted to $33^{rd}$ Conference on Neural Information Processing Systems (NeurIPS 2019).

"International Search Report and Written Opinion," mailed Oct. 19, 2020 in International Application No. PCT/US2020/047152, 13 pages.

Application No. EP20764553.2, Office Action, Mailed On Mar. 21, 2023, 7 pages.

\* cited by examiner

DEVICE-USAGE PROCESSING FOR GENERATING INFERRED USER STATES

CROSS-REFERENCES TO RELATED APPLICATIONS

This application claims the benefit of U.S. Provisional Application No. 62/899,598, filed Sep. 12, 2019, entitled "DEVICE-USAGE PROCESSING FOR GENERATING INFERRED USER STATES." The disclosure of this application is incorporated by reference herein in its entirety.

FIELD

The present disclosure relates generally to using artificial intelligence to transform application-usage and session data to an inferred user state.

BACKGROUND

A user of a device may transition through various states over years or over much shorter time periods. For example, a user's intelligence may change over the course of years, while a user's distraction or stress level may change over a single hour. In some instances, a user's state cannot be definitively identified. State detection may be particularly difficult when the state includes a mental state, as a user may be unwilling or unable to accurately identify his/her state. However, such information may be useful to change device functionality and/or add value to a user experience. Thus, it would be advantageous to control a device functionality based on an automatically generated inference of a user state.

SUMMARY

In some embodiments, a computer-implemented method is provided. At each of a set of time points, execution of an application at an electronic device can be detected. For each detected execution, an application-usage variable can be determined. One or more aggregated metrics can be generated based on aggregation of at least some of the application-usage variables. Based on the one or more aggregated metrics, a state identifier can be determined that corresponds to an inferred state of a user of the electronic device. A device-operation identifier can be retrieved that is associated with the state identifier. A device operation can be performed that is associated with the device-operation identifier.

Some embodiments of the present disclosure include a system including one or more data processors. The system can include a non-transitory computer readable storage medium containing instructions which, when executed on the one or more data processors, cause the one or more data processors to perform part or all of one or more methods and/or part or all of one or more processes disclosed herein.

Some embodiments of the present disclosure include a computer-program product tangibly embodied in a non-transitory machine-readable storage medium, including instructions configured to cause one or more data processors to perform part or all of one or more methods and/or part or all of one or more processes disclosed herein.

The following detailed description together with the accompanying drawings will provide a better understanding of the nature and advantages of the present invention.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Techniques are disclosed for controlling a device's operation based on an inferred state. More specifically, event streams can be collected at a user device to track usage of various applications. For example, each of multiple session event streams can characterize each session during when a device was in use (e.g., by identifying times at which the device was unlocked and locked). Each of multiple application event streams can identify each application that was in-focus (i.e., executing, in view, receiving user-interaction inputs and/or being the subject of the user's attention) and can further characterize a time period during which the application is in-view (e.g., by identifying start and end times and/or a duration). An embedded representation can be generated for each application represented in an application event stream, and a session-level embedded representation can be generated for each session based on the embedded representations of the applications used in the session. Each session can be assigned to a cluster based on the session-level embedded representation. A state (e.g., a cognitive state of a user) can be inferred based on aggregated cluster assignments. A device operation can be identified based on the state, and the device operation can be performed. For example, a notification with a recommendation to perform a particular activity (e.g., to communicate the state to a medical professional or to perform prescribed exercise?) may be presented and/or a communication may be transmitted. By processing the event streams in this manner, a state can be inferred using passive monitoring.

Figure 1:
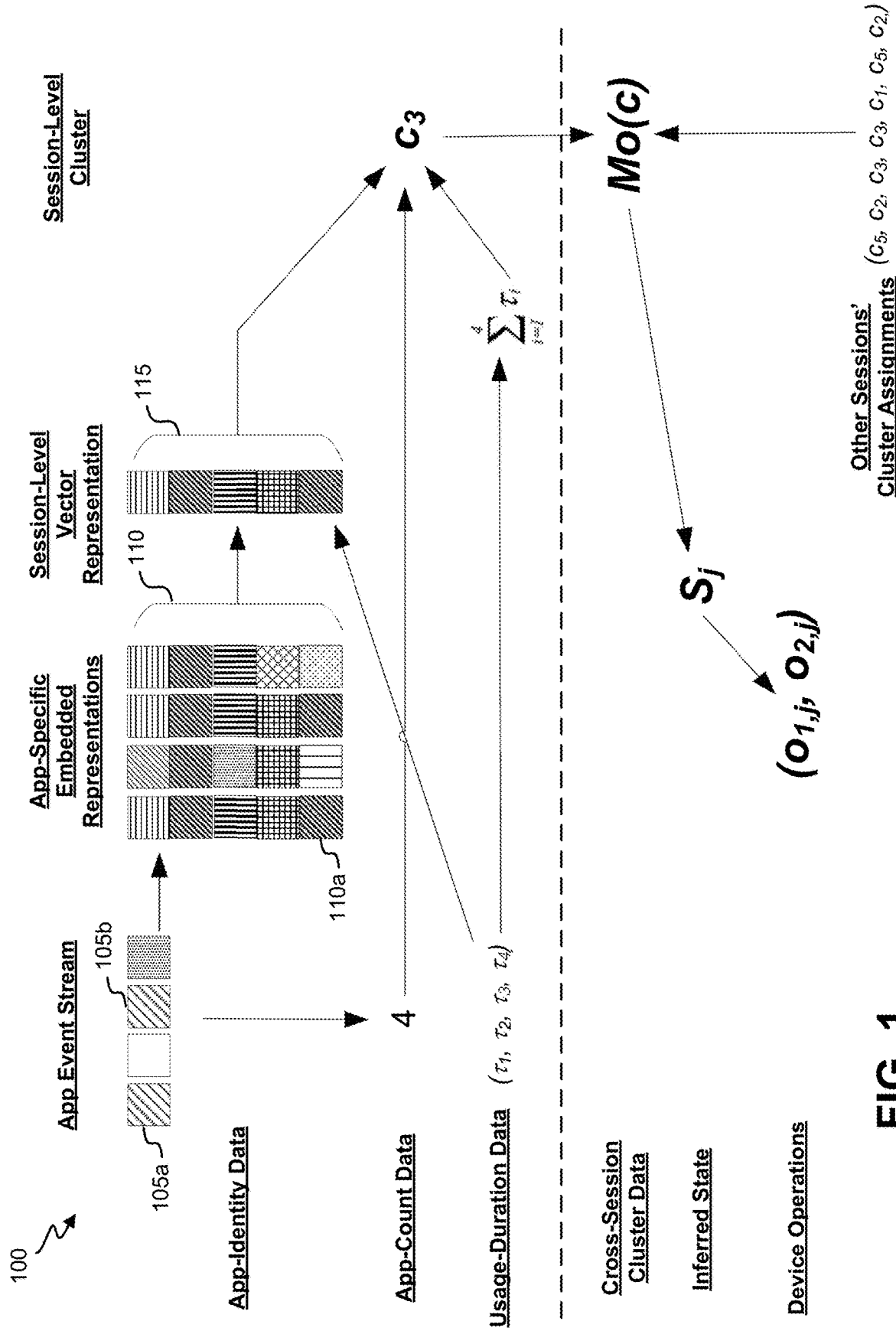
FIG. 1 shows a representation of a technique for processing application-usage data to trigger particular device operations according to some embodiments of the invention.

FIG. 1 shows a representation 100 of a technique for processing application-usage data to trigger particular device operations according to some embodiments of the invention. An application event stream is collected and processed at an electronic device. The application event stream can correspond to a single use session. A single use session may correspond to a time period during which it is inferred that a user is (e.g., actively) engaging with the device, a time period between the device being unlocked and the device subsequently locking, or a time period during which consecutive user inputs have inter-input intervals that remain below a predefined threshold. The application event stream can identify applications used during the session. In the depiction in FIG. 1, each box in the event stream represents usage of a single application. Each pattern represents a particular application. For example, box 105a represents a first usage of a particular application, and box 105b represents a second usage of the particular application. In this instance, three applications were used, though one of the applications was used twice. An application can be identified as being in use when (for example) it is in view (e.g., such that a window or interface of the application is in front of a window or interface of each other open application and/or such that at least part of a window or interface of the application is being presented on a screen of the device). The application event stream can also include, for each application usage, a duration during which the application was in use.

An application-specific embedded representation can be generated for each of the applications in the event stream. The embedded representation can include a vector in a high-dimensional vector space (e.g., having at least 20 dimensions, at least 50 dimensions or at least 100 dimensions). FIG. 1 depicts a set of application-level embedded representations 110 that includes 4 total (and 3 unique) application-specific embedded representations. Each application-specific embedded representations includes values (corresponding to various patterns) 5 dimensions. Each dimension/pattern can correspond to a particular feature. Thus, for example, box 110a can represent a value in a $5^{th}$ dimension representing a first usage of the first application. Features may be identified using (for example) a component analysis or neural network. The vector space and embedding can be defined to facilitate supporting (1) a prediction of a given application based on other applications included in a same sequence and/or (2) a prediction of one or more other applications in a sequence based on a given application in the sequence. The predictions may, but need not, be based on and/or account for an order in which the applications are used.

One or more aggregated metrics, which can include a session-level vector representation (e.g., corresponding to representation 115), can be generated based on the application-specific embedded representation(s) associated with the session. In some instances, the session-level vector representation is defined to be equal to an average or weighted average (with weights set based on duration of use, based on detected interaction with the applications, based on cross-user popularity of the applications, etc.) of the embedded representations across the applications used in a session. In some instances, the session-level vector representation is defined to be equal to one of the application-specific embedded representation(s) associated with the cluster. For example, the session-level vector representation may be defined to be set to the application-specific embedded representation associated with a particular application that was opened a highest number of times and/or was associated with a highest cumulative in-view time within the session.

A set of clusters can be identified using a clustering technique and the session-level vector representations. In the example depiction of FIG. 1, the session was assigned to a third cluster, $c_3$. The clustering technique may include (for example) Latent Dirichlet-Allocation, K-means clustering, mean-shift clustering, Density-Based Spatial Clustering of Application with Noise (DBSCAN), Expectation-Maximization (EM) clustering and/or hierarchical clustering. The clustering technique may receive, as inputs, multiple session-level vector representations that correspond (for example) to a single user and to multiple sessions. Outputs of the clustering technique can include a cluster assignment for each session-level vector representation (and thus for each session).

Session-specific clustering can, but need not, further be based on one or more other variables. In the depicted instance, the cluster assignment is further based on a number of application usages in the application event stream (4 in the depicted case) and a total time of the session, $\Sigma_{i=1}^{4} \tau_i$. A cluster assignment may (additionally or alternatively) depend on data not related to application usage but collected or identified during the session (e.g., a heart rate, a time of day, a day of the week, acceleration data and/or a location). A cluster assignment may (additionally or alternatively) depend on user information, such as an age of a user and/or a sex of a user.

In addition to a cluster assignment being generated for the particular represented session, a cluster assignment can similarly be generated for each of multiple other sessions to produce other sessions' cluster assignments ($c_5, c_2, c_3, c_3, c_5, c_2$). The particular session and other sessions may include each session occurring within a continuous time window, such as within a part of a day, a day, a week, a month, a year or multiple years. In some instances, the particular session and other sessions may include each session occurring within a non-continuous time window (e.g., each morning within a month; each weekday afternoon within a week; each time interval within a year during which acceleration and/or gyroscope data indicates that a user is either walking, standing or sitting).

The cluster assignments can be aggregated to generate (for example) histogram data (e.g., indicating a quantity or portion of sessions assigned to each of a set of clusters); a string or list of cluster assignments; and/or an array that identities, for each session, a cluster assignment and one or more other session variables (e.g., a session duration). In some instances, a cross-session metric can be determined based on the cluster assignments. In the depicted instance, the cross-session metric is a most-common cluster assignment Mo(c) (e.g., corresponding to a mode statistic). Other potential cross-session metrics that may alternatively or additionally be generated can include (for example) a fraction of cluster assignments that are equal to the most-common cluster assignment, a percentage of cluster assignments that identify a particular predefined cluster, and/or a weighted average of cluster assignments. The cross-session metric may additionally depend on other session data beyond cluster assignments. For example, each session may be associated with a cluster assignment and a session-duration statistic. In the illustrated instance, cross session metric Mo(c) depends on other sessions' cluster assignments ($c_5, c_2, c_3, c_3, c_1, c_5, c_2$). A cross-session metric may then represent a particular cluster that is associated with a highest cumulative duration.

A state can be inferred based on the cross-session metric and/or cluster assignments (e.g., including a distribution and/or histogram of cluster assignments across clusters). For example, in the depicted instance, the inferred state is $s_j$. The state can include a state of a user, such as a cognitive state, a state of cognitive health, mood, energy level, or quality of recent sleep. Inferring the state can include using a trained model to transform the cross-session metric, the cluster assignments and/or one or more other variables (each session's start and/or time, each session's duration, a frequency of sessions; an age of the user; average step counts or movement across recent time periods; etc.). For example, the trained model can include a logistic-regression model (e.g., an L1-regularized logistic-regression model), a linear-regression model, an explicit generative model (e.g., Linear Discriminative Analysis) neural network, or a gradient-boosted tree.

In some instances, inferring the state can include retrieving a state identifier stored in association with the cross-session metric. For example, when the cross-session metric is defined to be a most-common cluster, a data store may include a representation of each of a set of clusters and, for each cluster representation, an associated state identifier. In some instances, multiple clusters may be associated with a single identifier. In some instances, each state identifier is associated only with a single cluster. In various instances, a single cluster may be associated with only a single state identifier or with multiple state identifiers (e.g., corresponding to different types of states).

One or more device-operation identifiers (e.g., $o_{1j}$ and $o_{2j}$) can be determined based on the inferred state. The determination can include querying a data store with an identifier of the inferred state and receiving a query result the includes the device-operation identifier(s). A device-operation identifier may correspond to a device operation including (for example) presenting a notification that indicates or identifies the inferred state; presenting a notification that identifies a suggested action for a user to perform (e.g., meeting with a physician; performing physical activity; getting more sleep; using a particular type of device application; etc.); generating a communication that indicates the inferred state and identifies a user of the device and sending a communication to another device (e.g., of a medical-care provider); launching a particular application on the device; etc.

Figure 2:
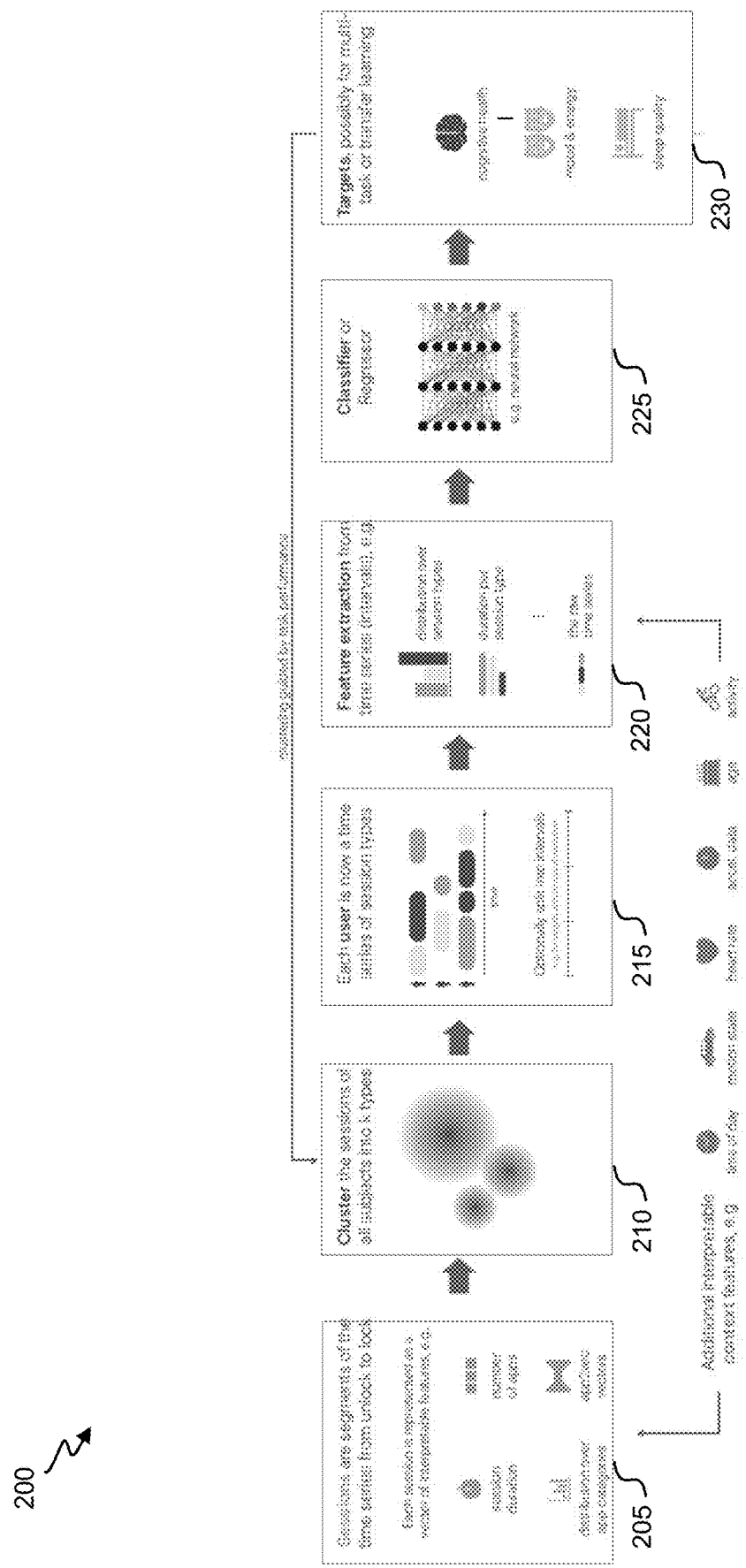
FIG. 2 shows a representation of a technique for processing application-usage data to infer target metrics according to some embodiments of the invention.

FIG. 2 shows a representation 200 of a technique for processing application-usage data to infer target metrics according to some embodiments of the invention. At block 205, session-specific data is accessed. The session-specific data can identify, for each of a set of sessions, a duration of the session, a number of applications used (e.g., selected, opened and/or being in-view) during the session, which applications were used during the session, an embedded representation of the applications used during the session, a category of each application used during the session, a distribution across application categories, and so on. Additional contextual features associated with each session may further be accessed. For example, contextual features can include a start time of a session, an end time of a session, a day of the week, a motion state of the device (e.g., detected using a GPS receiver, gyroscope and/or accelerometer), heart rate of a user, acceleration data, an age of a user (e.g., determined based on previously received user input) and/or an activity that the user is engaged in during the session.

At block 210, each of the sessions is assigned to a cluster. The cluster assignment may be made using a clustering and/or categorization technique. For example, a cluster assignment can be made using k-means analysis, a neural network, or a distance-based approach.

At block 215, a time-series data structure is generated. The time-series data structure can include a set of data points, each of which corresponds to a session. Each data point can include an identifier of a cluster to which the session was assigned and a temporal variable that indicates when the session occurred. In some instances, the temporal variable includes multiple sub-variables, such as a time of day, day of the week and/or date. The time-series data structure can then group or order session data based on one or more sub-variables. For example, cluster assignments of sessions occurring in the morning may be analyzed separately from cluster assignments of sessions occurring in the afternoon, evening or night (e.g., which may, but need not, be separately analyzed). As another example, cluster assignments of sessions occurring on a weekday may be analyzed separately from cluster assignments of sessions occurring on a weekend.

At block 220, features are identified based on the cluster assignments. In some instances, for each cluster represented in the cluster assignments, a quantity and/or duration variable (e.g., total duration or average duration) of sessions assigned to the cluster is determined. In some instances, a feature includes the time-series data generated at block 215. A feature may include an identification of a cluster to which a highest number of sessions were assigned. In some instances, contextual information associated with the sessions can be used during the feature extractions. For example, a distribution (e.g., that identifies a number of sessions assigned to distinct clusters or that indicates a duration variable for each cluster) may be generated using data when a user's heart rate is below a threshold. As another example, a multi-dimensional feature may be generated that identifies session metrics for each combination of a particular cluster and a particular context-information bin (e.g., time period of the day).

At block 225, the features are processed by a trained model. The trained model can include a machine-learning model, a classifier, a regression model, a neural network, etc. An output of the model can include a numeric value and/or a categorical value.

At block 230, a state identifier is determined. The state identifier may correspond to an inferred state of a user, such as a user's cognitive health, mood, energy level or recent sleep quality. The state identifier may be determined by (for example) comparing an output of the model to one or more thresholds, applying an activation function to an output of the model, and/or identifying a state identifier associated with an output. In some instances, the state identifier variable includes an output of the model. In some instances, the state identifier is presented at the user device and/or transmitted to another device. In some instances, determination of the state identifier triggers another type of device operation (e.g., to adjust a morning alarm time or bedtime time; to change a station on a music app operating at the device; etc.). In some instances, the state identifier may be locally and/or remotely logged (e.g., in association with a time stamp and/or identifier of the user device).

Figure 3:
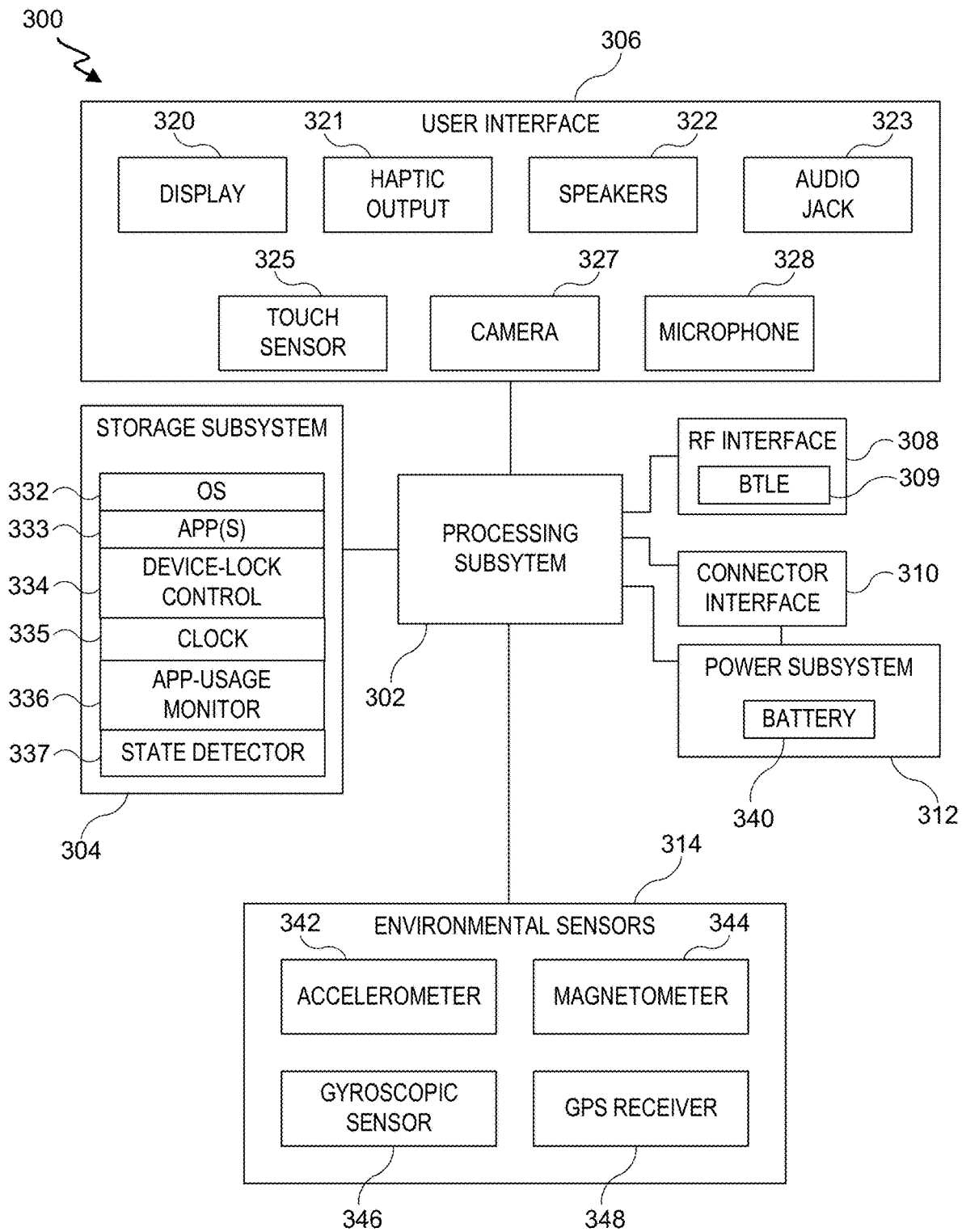
FIG. 3 is a simplified block diagram of an electronic device according to some embodiments of the present invention.

FIG. 3 is a simplified block diagram of a device 300 according to an embodiment of the present invention. Device 300 can include (for example) a smart phone, wearable device, laptop, tablet, or desktop computer. Device 300 can include processing subsystem 302, storage subsystem 304, user interface 306, one or more connection components (e.g., RF interface 308 and/or connector interface 310), power subsystem 312, and environmental sensors 314. Device 300 can also include other components (not explicitly shown).

Storage subsystem 304 can be implemented, e.g., using magnetic storage media, flash memory, other semiconductor memory (e.g., DRAM, SRAM), or any other nontransitory storage medium, or a combination of media, and can include volatile and/or nonvolatile media. In some embodiments, storage subsystem 304 can store media items such as audio files, video files, image or artwork files; information about a user's contacts (names, addresses, phone numbers, etc.); appointments and events; notes; and/or other types of information, examples of which are described below. In some embodiments, storage subsystem 304 can also store one or more application programs (or apps) 333 to be executed by processing subsystem 302 (e.g., video game programs, personal information management programs, media playback programs, interface programs associated with particular host devices and/or host device functionalities, etc.).

Storage subsystem 304 can include a device-lock control 334 that controls whether the device is in a locked or unlocked configuration. A default configuration can be the locked configuration, and device-lock control 334 can transition device 300 to an unlocked configuration upon detecting that a valid numeric, text or biometric password has been input. Device-lock control 334 can transition device 300 back to a locked configuration upon detecting (for example) inactivity for a particular period of time (e.g., a predefined period of time and/or a period of time as indicated in a setting). Device 300 may avail a reduced number of applications 333 while in a locked configurations. For example, device 300 may generally prevent access to some or all applications 333. Device-lock control 334 may generate a session event stream that identifies, for each time that device 300 is unlocked or locked, a time of the unlocking or locking. The times can be determined using a clock application 335.

Storage subsystem 304 can include an app-usage monitor 336. App-usage monitor 336 can detect which application is in use at various points in time. An application may be characterized as being in use if, for example, a window or interface of the application is being presented and/or in front of any other window or interface. App-usage monitor 336 may selectively monitor for application usage during sessions during which the application is unlocked. App-usage monitor 336 can generate an application event stream that identifies each application used during a session and a time period during which each application was used (e.g., via start and end times). The times can be determined using clock application 335.

Storage subsystem 304 can include a state detector 337 that infers a state based on the application event stream and potentially the session event stream. The state can include a state of a user of device 300. Inferring a state can include identifying a cluster assignment for each session based on which application(s) were used during the session and identifying the state based on the cluster assignments. State detector 337 may trigger and/or perform an action based on the state that was inferred. For example, a particular notification (e.g., identifying the state) may be presented, a communication may be generated and transmitted to another device and/or a particular application can be opened.

User interface 306 can include any combination of input and output devices. A user can operate input devices of user interface 306 to invoke the functionality of device 300 and can view, hear, and/or otherwise experience output from device 300 via output devices of user interface 306. Device-lock control 334 may use data from user interface 306 to determine whether to change a locked/unlocked configuration of device 300. App-usage monitor 336 can use data from user interface 306 to determine which application is in use during different points of a session. State detector 337 may use output components of user interface 306 to perform an action in response to a state inference.

Examples of output devices include display 320, haptic output generator 321 and speakers 322. Display 320 can be implemented using compact display technologies, e.g., LCD (liquid crystal display), LED (light-emitting diode), OLED (organic light-emitting diode), or the like. In some embodiments, display 320 can incorporate a flexible display element or curved-glass display element, allowing device 300 to conform to a desired shape. One or more speakers 321 can be provided using small form-factor speaker technologies, including any technology capable of converting electronic signals into audible sound waves. In some embodiments, speakers 321 can be used to produce tones (e.g., beeping or ringing) and can but need not be capable of reproducing sounds such as speech or music with any particular degree of fidelity. Haptic output generator 322 can be, e.g., a device that converts electronic signals into vibrations; in some embodiments, the vibrations can be strong enough to be felt by a user wearing device 300 but not so strong as to produce distinct sounds.

Examples of input devices include touch sensor 325, camera 327 and microphone 328. Touch sensor 325 can include, e.g., a capacitive sensor array with the ability to localize contacts to a particular point or region on the surface of the sensor and in some instances, the ability to distinguish multiple simultaneous contacts. In some embodiments, touch sensor 325 can be overlaid over display 320 to provide a touchscreen interface, and processing subsystem 304 can translate touch events (including taps and/or other gestures made with one or more contacts) into specific user inputs depending on what is currently displayed on display 320.

Camera 327 can include, e.g., a compact digital camera that includes an image sensor such as a CMOS sensor and optical components (e.g. lenses) arranged to focus an image onto the image sensor, along with control logic operable to use the imaging components to capture and store still and/or video images. Images can be stored, e.g., in storage subsystem 304 and/or transmitted by device 300 to other devices for storage. Depending on implementation, the optical components can provide fixed focal distance or variable focal distance; in the latter case, autofocus can be provided. In some embodiments, camera 327 can be disposed along an edge of a face member of a device, e.g., the top edge, and oriented to allow a user to capture images of nearby objects in the environment such as a bar code or QR code. In other embodiments, camera 327 can be disposed on the front surface of a device face member, e.g., to capture images of the user. Zero, one, or more cameras can be provided, depending on implementation.

Microphone 328 can include any device that converts sound waves into electronic signals. In some embodiments, microphone 328 can be sufficiently sensitive to provide a representation of specific words spoken by a user; in other embodiments, microphone 328 can be usable to provide indications of general ambient sound levels without necessarily providing a high-quality electronic representation of specific sounds.

In some embodiments, user interface 306 can provide output to and/or receive input from an auxiliary device such as a headset. For example, audio jack 323 can connect via an audio cable (e.g., a standard 2.5 mm or 3.5 mm audio cable) to an auxiliary device. Audio jack 323 can include input and/or output paths. Accordingly, audio jack 323 can provide audio to the auxiliary device and/or receive audio from the auxiliary device. In some embodiments, a wireless connection interface can be used to communicate with an auxiliary device.

Processing subsystem 302 can be implemented as one or more integrated circuits, e.g., one or more single-core or multi-core microprocessors or microcontrollers, examples of which are known in the art. In operation, processing system 302 can control the operation of device 300. In various embodiments, processing subsystem 304 can execute a variety of programs in response to program code and can maintain multiple concurrently executing programs or processes. At any given time, some or all of the program code to be executed can be resident in processing subsystem 304 and/or in storage media such as storage subsystem 304.

Through suitable programming, processing subsystem 302 can provide various functionality for device 300. For example, in some embodiments, processing subsystem 302 can execute an operating system (OS) 332 and various applications 333 such as a phone-interface application, a text-message interface application, a media interface application, a fitness application, and/or other applications. In some embodiments, some or all of these application programs can interact with a host device, e.g., by generating messages to be sent to the host device and/or by receiving and interpreting messages from the host device. In some embodiments, some or all of the application programs can operate locally to device 300. For example, if device 300 has a local media library stored in storage subsystem 304, a media interface application can provide a user interface to select and play locally stored media items.

Processing subsystem 302 can also execute a code for one or more components of device 300. For example, processing subsystem 302 can execute a code for device-lock-control 334, clock 335, app-usage monitor 336 and/or state detector 337.

RF (radio frequency) interface 308 can allow device 300 to communicate wirelessly with various devices. RF interface 308 can include RF transceiver components such as an antenna and supporting circuitry to enable data communication over a wireless medium, e.g., using WiFi (IEEE 802.11 family standards), Bluetooth® (a family of standards promulgated by Bluetooth SIG, Inc.), or other protocols for wireless data communication. In some embodiments, RE interface 308 can implement a Bluetooth LE (Low energy) proximity sensor 309 that supports proximity detection through an estimation of signal strength and/or other protocols for determining proximity to another electronic device.

In some embodiments, RF interface 308 can provide nearfield communication ("NEC") capability, e.g., implementing the ISO/IEC 18092 standards or the like; NFC can support wireless data exchange between devices over a very short range (e.g., 20 centimeters or less). RF interface 308 can be implemented using a combination of hardware (e.g., driver circuits, antennas, modulators/demodulators, encoders/decoders, and other analog and/or digital signal processing circuits) and software components. Multiple different wireless communication protocols and associated hardware can be incorporated into RF interface 308.

Connector interface 310 can allow device 300 to communicate with various devices (e.g., a server or coordinating device) via a wired communication path, e.g., using Universal Serial Bus (USB), universal asynchronous receiver/transmitter (UART), or other protocols for wired data communication. In some embodiments, connector interface 310 can provide a power port, allowing device 300 to receive power, e.g., to charge an internal battery. For example, connector interface 310 can include a connector such as a mini USB connector or a custom connector, as well as supporting circuitry. In some embodiments, a device can be powered or charged via inductive charging. In some embodiments, the connector can be a custom connector that provides dedicated power and ground contacts, as well as digital data contacts that can be used to implement different communication technologies in parallel; for instance, two pins can be assigned as USB data pins (D+ and D) and two other pins can be assigned as serial transmit/receive pins (e.g., implementing a UART interface). The assignment of pins to particular communication technologies can be hardwired or negotiated while the connection is being established. In some embodiments, the connector can also provide connections for audio and/or video signals, which can be transmitted to or from another device in analog and/or digital formats.

In some embodiments, connector interface 310 and/or RF interface 308 can be used to support synchronization operations in which data is transferred from a another device to device 300 (or vice versa). For example, a user can be able to customize settings and other information for device 300. While user interface 306 can support data-entry operations, a user can find it more convenient to define customized information on a separate device (e.g., a tablet or smartphone) that has a larger interface (e.g., including a real or virtual alphanumeric keyboard), then transfer the customized information to device 300 via a synchronization operation. Synchronization operations can also be used to load and/or update other types of data in storage subsystem 304, such as media items, application programs, personal data, and/or operating system programs. Synchronization operations can be performed in response to an explicit user request and/or automatically, e.g., when device 300 resumes communication with a particular host device or in response to either device receiving an update to its copy of synchronized information.

Environmental sensors 314 can include various electronic, mechanical, electromechanical, optical, or other devices that provide information related to external conditions around device 300. Sensors 314 in some embodiments can provide digital signals to processing subsystem 302, e.g., on a streaming basis or in response to polling by processing subsystem 302 as desired. Any type and combination of environmental sensors can be used; shown by way of example are accelerometer 342, a magnetometer 344, a gyroscope 346, and a GPS receiver 348.

Some environmental sensors can provide information about the location and/or motion of device 300. For example, accelerometer 342 can sense acceleration (relative to freefall) along one or more axes, e.g., using piezoelectric or other components in conjunction with associated electronics to produce a signal. Magnetometer 344 can sense an ambient magnetic field (e.g., Earth's magnetic field) and generate a corresponding electrical signal, which can be interpreted as a compass direction, Gyroscopic sensor 346 can sense rotational motion in one or more directions, e.g., using one or more MEMS (microelectromechanical systems) gyroscopes and related control and sensing circuitry. Global Positioning System (GPS) receiver 348 can determine location based on signals received from GPS satellites. In some instances, data detected from one or more environmental sensors can be used to identify a gesture indicative of particular input. For example, rather than using a touchscreen to select a notification action and/or dismiss an alert or notification, this information can be conveyed by a particular arm movement.

Other sensors can also be included in addition to or instead of these examples. For example, a sound sensor can incorporate microphone 326 together with associated circuitry and/or program code to determine, e.g., a decibel level of ambient sound. Temperature sensors, proximity sensors, ambient light sensors, or the like can also be included.

Power subsystem 312 can provide power and power management capabilities for device 300. For example, power subsystem 314 can include a battery 340 (e.g., a rechargeable battery) and associated circuitry to distribute power from battery 340 to other components of device 300 that require electrical power. In some embodiments, power subsystem 312 can also include circuitry operable to charge battery 340, e.g., when connector interface 310 is connected to a power source. In some embodiments, power subsystem 312 can include a "wireless" charger, such as an inductive charger, to charge battery 340 without relying on connector interface 310. In some embodiments, power subsystem 312 can also include other power sources, such as a solar cell, in addition to or instead of battery 340.

In some embodiments, power subsystem 312 can control power distribution to components within device 300 to manage power consumption efficiently. For example, power subsystem 312 can automatically place device 300 into a hibernation state (e.g., locked configuration) upon receiving a signal from device-lock control 334 to make the transition and/or indicating that no input activity has been detected for at least a predefined period of time. The hibernation state can be designed to reduce power consumption; accordingly, user interface 306 (or components thereof), RF interface 308, connector interface 310, and/or environmental sensors 314 can be powered down (e.g., to a low-power state or turned off entirely), while other sensors can be powered up (either continuously or at intervals) to detect when a user puts on or uses a device.

Power subsystem 312 can also provide other power management capabilities, such as regulating power consumption of other components of device 300 based on the source and amount of available power, monitoring stored power in battery 340, generating user alerts if the stored power drops below a minimum level, and so on.

In some embodiments, control functions of power subsystem 312 can be implemented using programmable or controllable circuits operating in response to control signals generated by processing subsystem 302 in response to program code executing thereon (e.g., of device-lock control 334), or as a separate microprocessor or microcontroller. In some embodiments, control functions of power subsystem 312 can be based on user interaction with the device (e.g., to power down components if a device has not been interacted with in a particular manner, such as via a touch, button press or network activity, for a defined period of time).

In various embodiments, a user interface can include any combination of any or all of the components described above, as well as other components not expressly described. For example, in some embodiments, the user interface can include, e.g., just a touchscreen, or a touchscreen and a speaker, or a touchscreen and a haptic device. Where the device has an RF interface, a connector interface can be omitted, and all communication between the device and other devices can be conducted using wireless communication protocols. A wired power connection, e.g., for charging a battery of the device, can be provided separately from any data connection.

Further, while the device is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software. It is also not required that every block in FIG. 3 be implemented in a given embodiment of a device.

Figure 4:
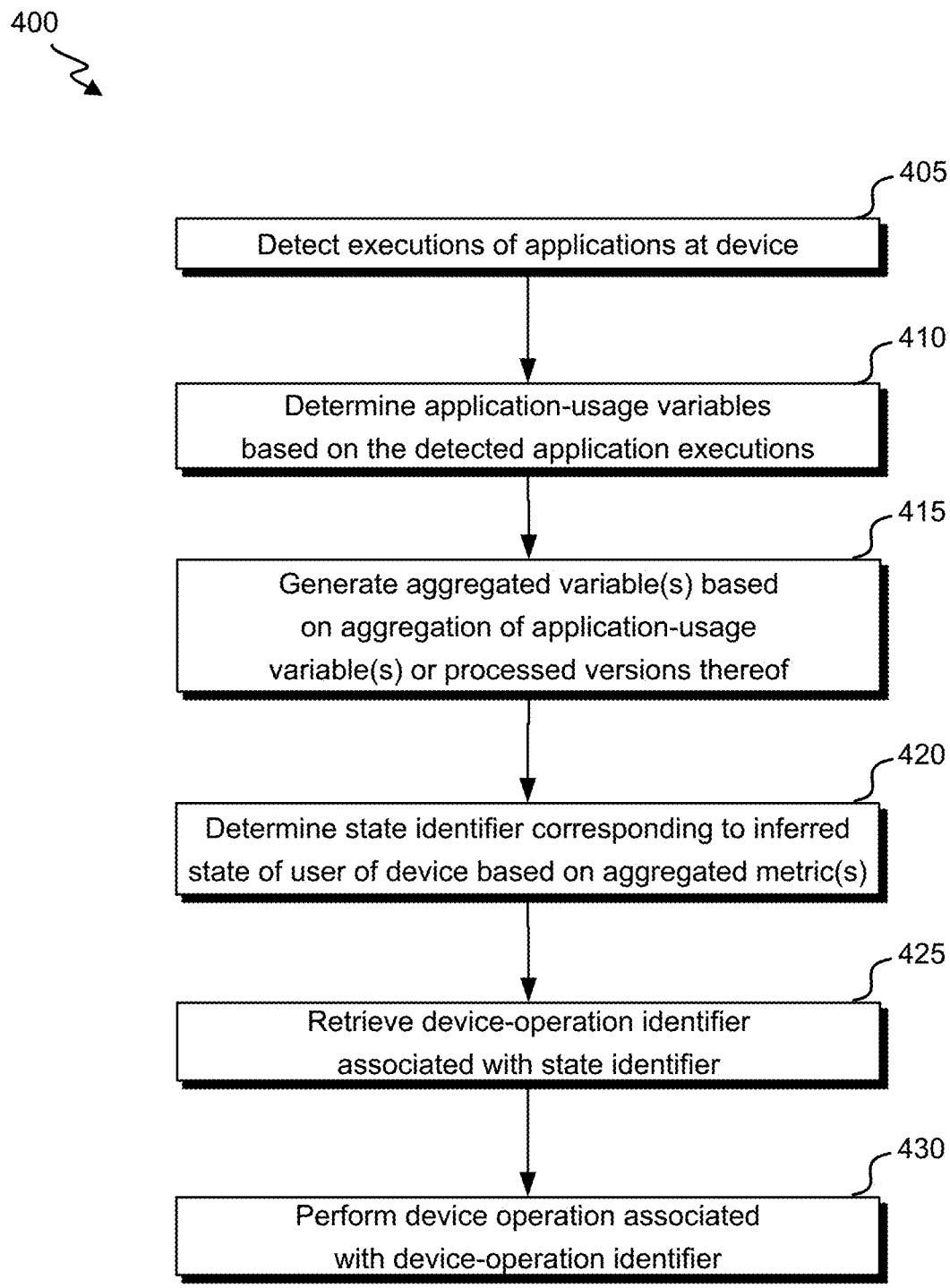
FIG. 4 is a flow diagram of a process for controlling device operations based on detected application executions according to some embodiments of the present invention.

FIG. 4 is a flow diagram of a process 400 for controlling device operations based on detected application executions according to some embodiments of the present invention. Process 400 can be performed in part or in its entirety at a user device. Process 400 begins at block 405 where execution of applications at a device are detected. For example, block 405 can include detecting events that include each time an application is opened, each time an application is closed and/or which application is in use and/or in a front presentation. In some instances, event monitoring is limited to apply only to events detected while the user device is in an unlocked configuration.

At block 410, for each of the detected application executions, one or more application-usage variables are determined. An application-usage variable can identify a particular application that was opened, used, closed and/or in a front presentation. In some instances, different types of application-usage variables are determined. For example, the one or more application-usage variables can include both an identifier of a particular application; a duration for which the particular application was in use; and one or more characteristics of the particular application.

At block 415, one or more aggregated metrics are generated based on an aggregation of the application-usage variables or processed versions thereof. The one or more aggregated metrics can include a single variable or collection of variables that represent multiple application executions (e.g., occurring within a single session). The one or more aggregated metrics may be determined by (for example) identifying an application that was used the most times and/or for a longest cumulative time across the multiple application executions. The one or more aggregated metrics can include a session-level embedded representation and/or a vector.

In some instances, an application-usage variable that includes an identifier of an application is transformed into an embedded representation of the application using an embedding. The embedding may have been learned based on a training data set that included vectors identifying applications used in individual sessions (e.g., either preserving a use order or without indicating an order of use). The embedding can be generated to facilitate predicting one or more application identifiers in a vector given an identity of one or more other application identifiers in the vector. The aggregated metric(s) can then be determined based on the embeddings. For example, an aggregated metric may be defined to be an average of the embedded representations across applications used in a session or an embedded representation of an application that was used the most times or for a longest cumulative time in a session.

At block 420, a state identifier is determined that corresponds to an inferred state of a user of the device. For example, an inferred state may correspond to a level of cognitive health, a mood, a degree of focus, and/or whether the user is well-rested. The state identifier can be determined based on the one or more aggregated metrics. In some instances, the one or more aggregated metrics includes multiple aggregated metrics that correspond to a set of sessions. Thus, an identifier of each of session may be associated with at least one aggregated metric, which can be used to identify a cluster for the session. The cluster assignments can be used to determine the inferred state.

At block 425, a device-operation identifier that is associated with the state identifier is retrieved. The device-operation identifier may correspond to a device operation including (for example) presenting a particular type of notification, transmitting a particular type of communication to another device, opening an application, scheduling one or more notifications (e.g., recommending sleep hours), and/or scheduling another state-inferring process. At block 430, a device operation associated with the device-operation identifier is performed. A device operation may include (for example) presenting (or not presenting) a notification. The notification may include an alert, a recommendation and/or information. For example, a notification may identify an inferred state as being consistent with sub-optimal attention levels (and/or cognitive health) and may include a recommendation for the user to call a health provider. A device operation may (e.g., additionally or alternatively) include changing a device-associate scheduled do-not-disturb time period and/or bedtime period. For example, a device-associated do-not-disturb (e.g., during which alerts and/or notifications are not presented) may be automatically modified to begin at an earlier time when an inferred state corresponds to low alertness. As another example, a bedtime may be shifted to an earlier time (e.g., to prompt a user to go to sleep at the earlier time) in response to an inferred state that corresponds to low attentiveness.

Figure 5:
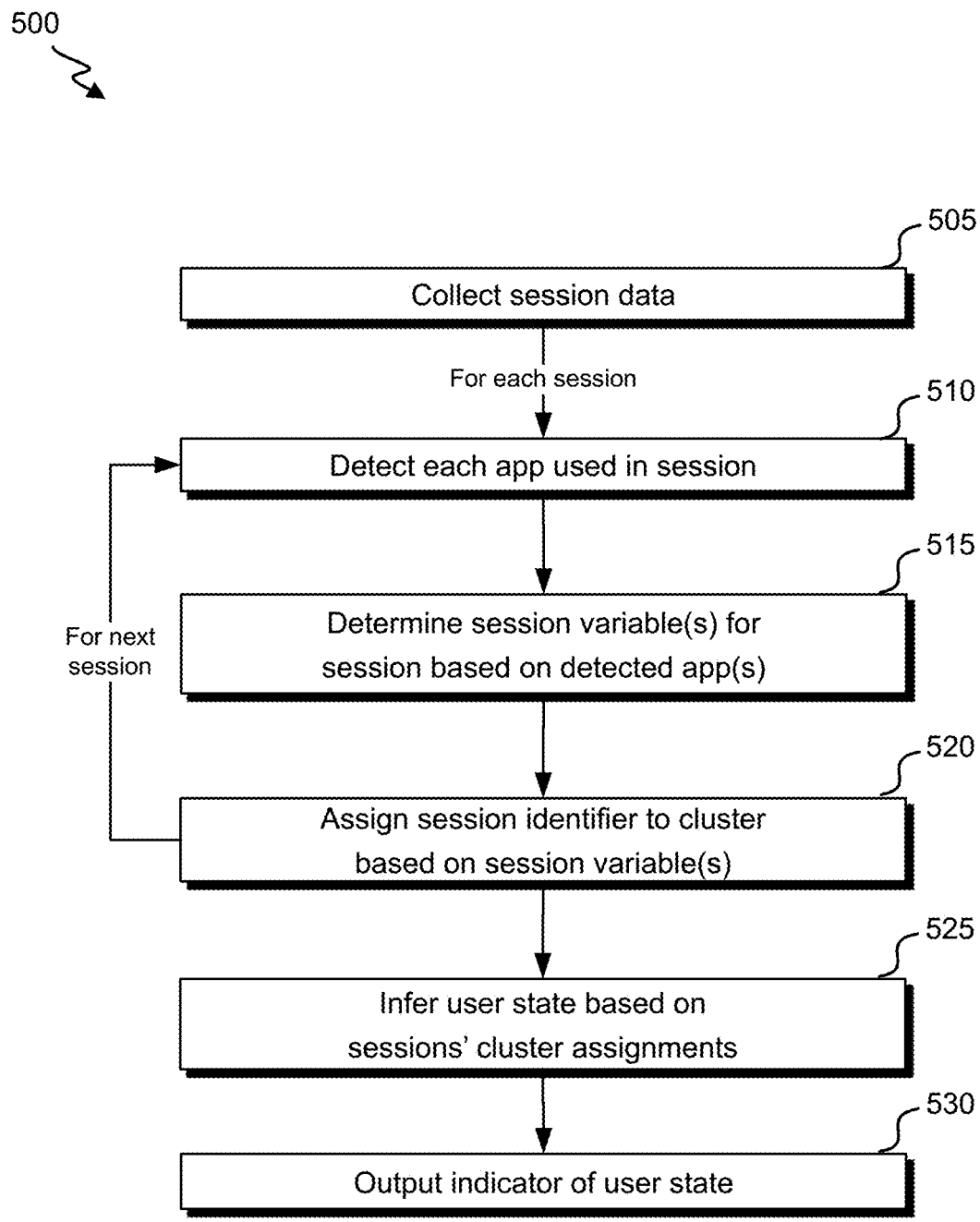
FIG. 5 is a flow diagram of a process for processing session data to infer user states according to some embodiments of the present invention.

FIG. 5 is a flow diagram of a process 500 for processing session data to infer user states according to some embodiments of the present invention. Process 500 can be performed in part or in its entirety at a user device. Process 500 begins at block 505 where session data is collected. The session data can correspond to multiple sessions. The session data may include (for example) an identifier of each application used during the session; a duration that each application was used during the session; a duration of the session; and/or contextual information of the session (e.g., a start and/or end time, day of the week, acceleration data, location data etc.).

Blocks 510-520 can be performed for each session represented in the session data. At block 510, each application used in the session can be detected. Additional information about application can further be detected, such as an order in which applications were used, a duration of each individual application usage, etc. The detections and determinations of block 510 can be performed using the session data collected at block 505.

At block 515, one or more session variables are determined for the session based on the application(s) used in the session. The session-level variable(s) can represent characteristics of applications used during the session, an order of usage of applications of various types in the session, use-duration data, etc.

In some instances, the session-level variable(s) includes an embedded representation. For example, an application-specific embedded representation can be generated for each application detected in block 510 using an embedding. The embedding may have been generated based on a degree to which various applications co-occur within individual sessions and relative orders of usage of applications within a session. A session-level embedded representation can then be determined based on application-level embedded representations of applications within the session. The session-level embedded representation may be defined to be (for example) a mean, median or mode of the corresponding application-level embedded representations.

At block 520, a session identifier associated with the session can be assigned to a cluster based on the session variable(s). For example, the cluster assignment may be performed using k-means, a component analysis, a distance-based approach, etc.

At block 525, a user state can be inferred based on the sessions' cluster assignments. The user state may be one of a set of predefined user states. Cluster assignments can be individually fed (e.g., in a processed or raw form) to a trained model with or without accompanying contextual data. For example, session dates and cluster assignments can processed by a recurrent neural network model. In some instances, a histogram of cluster assignments can be generated and processed by a trained model to identify a state.

At block 530, an indicator of the user state is output. Block 530 can include a presentation and/or a transmission. The presentation and/or transmission can, but need not, identify the user state. The presentation and/or transmission may include an action that is recommended for performance. In some instances, instead of or in addition to outputting the indicator, a device action is automatically performed.

It will be appreciated that variations of the disclosed embodiments are contemplated. For example, processing of session and application-usage data to infer a state may be performed in part or in its entirety in a remote and/or cloud computing system. As another example, interpretable features of applications or sessions may be used in place or in addition to embedded representations of applications or sessions. Interpretable features may include (for example) a category of an application (e.g., as indicated via metadata of the application or by querying a source); a popularity of an application (e.g., generally or across a given demographic, either of which may be determined by querying a source), a time period since a last use of an application on a device associated with the session, etc.

EXAMPLE

Phone-usage data is collected over a 12-week period for each of 31 people with clinically diagnosed cognitive impairment and 82 healthy controls in normal living conditions. The ages of the subjects are between 60 and 75 with a median age of 66. The phone-usage data includes an application-usage event stream that consists of timestamps of all openings and closings of applications and identities of the opened or closed application (corresponding to when an application was in view). Further, the phone-usage data includes a lock/unlock event stream that consists of timestamps for all phone unlock and lock events and an indication as to whether the event was a lock event or unlock event. Across subjects, the application-usage event streams represented approximately one million application launches, and the lock/unlock event stream represents approximately 500,000 phone unlock events.

An application-level embedded representation is generated for each application identified in any application-usage event stream. The embedding is generated by training a model to learn an embedding that facilitates predicting an application in an application-usage event stream based on neighboring applications in the event stream.

Individual usage sessions are identified using the lock/unlock event streams. A session is defined as a time period between an unlock event and a lock event. For each session, a session-level embedded representation is defined as an average of the application-level embedded representations of all applications used during the session. A cluster is assigned to each session using k-means clustering representing a session type. Thus, a given's user's phone usage is then represented by a time-series of session types. A histogram over session types is generated, and an L1-regularized logistic regression is used to classify cognitive health.

Model parameters learned through training include the weights of the logistic regression classifier. Hyperparameters of the model include the number of session types that are used for clustering sessions and the regularization strength used in the logistic regression. Due to the number of users in the data set being relatively small, analyzes are performed using N leave-one-out train/test splits. For each N splits, model hyperparameters are selected via a second leave-one-out cross-validation loop on the N−1 training subjects. Final performance is evaluated by computing the area under the Receiver-Operator Curve using the predicted scores from each of N test predictions.

The full model entails learned application embeddings, grouping of applications into sessions and clustering sessions into session types. Here, an impact of each of several model configurations is evaluated on the ability to infer cognitive health. For each baseline, the representation of phone usage is varied, while cognitive health is predicted using logistic regression from histograms over those representations just as in the full model.

A first baseline (131) is aimed to isolate the effect of grouping the application event stream into interaction sessions. Each application is represented by its app2vec embedding and clustering is performed on the application embeddings to identify different application types. A user is represented by a histogram over application types instead of session types. The next three baselines (B2, B3, B4) aim to isolate the effect of clustering sessions based on learned application embeddings. Each application is represented by either a one-hot encoding over all applications (B2) or a one-hot encoding over all app-store categories (B3) in the dataset. Learned application embeddings (B4) are randomly permuted to destroy the learned structure in the embedding space but preserve the statistics of the embeddings. In these baselines, applications are still grouped in sessions. For B2 and B3, the session type is represented by the one-hot encoding of the application that was open longest during the session. For B4, sessions are represented and clustered into session types in the same way as for the full model.

Two baselines with minimal structure (B5, B6) are evaluated. As for B2 and B3, we represent applications using one-hot encodings but without grouping them into interaction sessions using the phone unlock/lock events.

Results indicate that cognitive-health estimates generated using the full model are more accurate than baseline state-of-the-art estimates. Grouping the application-level data into sessions improves accuracy both when using the learned embeddings and when using the one-hot encodings. Categorizing applications and sessions using learned embeddings is associated with improved accuracy over ad hoc categorization using application identity or app-store category.

Thus, the results demonstrate that passive monitoring of phone usage enables inferences about a user's cognitive health.

As described above, one aspect of the present technology is the gathering and use of data available from various sources (e.g., users' phones) to infer user states and/or initiate device operations. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to estimate a sub-optimal, impaired and/or declined user state and recommend that the user seek subsequent evaluation. As another example, the personal information data can be used to estimate a mood or energy level of a user and adjust application operations and/or recommendations accordingly. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of monitoring application usage, monitoring lock/unlock events and/or triggering device operations, the present technology can be configured to allow users to select to "opt in" or "opt out" of participation in the collection of personal information data during registration for services or anytime thereafter. In another example, users can select not to allow transmissions to be sent to other devices identifying an inferred state and/or not to allow inferred states to be locally or remotely stored. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, a state may be inferred based on temporal characteristics of application usage (e.g., how long individual applications were used, when they were used and how many applications were used in a session) based on non-personal information data or a bare minimum amount of personal information (e.g., without identifying which application was in use).

The present description may make reference to specific examples of a user device, such as a device. It is to be understood that these examples are illustrative and not limiting; other devices can be substituted and can implement similar functional blocks and/or algorithms to perform operations described herein and/or other operations. In some instances, a user device can be non-wearable and/or non-mobile.

Embodiments of the present invention, e.g., in methods, apparatus, computer-readable media and the like, can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A computer-implemented method comprising:
   detecting, at each of a set of time points, execution of an application at an electronic device;
   determining, for each detected execution, an application-usage variable, wherein the application-usage variable is a temporal characteristic of application usage;
   generating, for each session of the electronic device, one or more aggregated metrics for the session of the electronic device based on aggregation of at least some of the application-usage variables generated during the session of the electronic device, thereby generating a plurality of aggregated metrics, wherein a session of the electronic device is a time period between an unlock event and a subsequent lock event, and wherein each aggregated metric of the plurality of aggregated metrics is associated with a session identifier of a plurality of session identifiers;
   assigning each of the plurality of aggregated metrics to a cluster of a plurality of clusters;
   determining, based on numbers of sessions assigned to each of the clusters associated with the plurality of session identifiers, a state identifier corresponding to an inferred cognitive state of a user of the electronic device;
   retrieving a device-operation identifier associated with the state identifier; and
   performing a device operation associated with the device-operation identifier.

2. The method of claim 1, wherein:
   a first subset of the set of time points were during a first use session of the electronic device;
   a second subset of the set of time points were during a second use session of the electronic device;
   the electronic device was in a locked state for at least part of a time period between the first use session and the second use session; and
   generating the one or more aggregated includes:
   generating a first aggregated metric of the one or more aggregated metrics based on aggregation of a first subset of the application-usage variables corresponding to the first use session; and
   generating a second aggregated metric of the one or more aggregated metrics based on aggregation of a second subset of the application-usage variables corresponding to the first use session.

3. The method of claim 1, wherein:
   the one or more aggregated metrics includes a plurality of aggregated metrics, each of the plurality of aggregated metrics being associated with a use session of a plurality of use sessions; and
   determining the state identifier includes:
   assigning each of the plurality of aggregated metrics to a cluster of a plurality of clusters; and
   determining the state identifier based on the cluster assignments.

4. The method of claim 1, wherein determining the state identifier includes using a regression technique, component-analysis technique, distance-based technique, and/or neural network.

5. The method of claim 1, wherein:
   each determined application-usage variable includes an identifier of a particular application that was executed; and
   generating the one or more aggregated metrics includes:

generating a data object that includes a set of particular applications and that indicates an order in which the set of particular applications were executed;
embedding the data object; and
generating an aggregated metric based on the embedded data object, the aggregated metric having a reduced dimensionality as compared to a dimensionality of the embedded data object.

6. The method of claim 1, wherein the application-usage variable comprises at least one selected from a group consisting of an identifier that is specific to the executed application and a duration of the detected execution.

7. The method of claim 1, wherein detecting, at each of the set of time points, comprises detecting a session of an application, thereby detecting a set of sessions, and wherein the one or more aggregated metrics are aggregated over the set of sessions.

8. The method of claim 1, wherein the one or more aggregated metrics are aggregated over the set of time points.

9. The method of claim 1, wherein the application-usage variable identifies the application, a duration of the execution, and one or more characteristics of the application.

10. The method of claim 1, wherein the application-usage variable does not identify the application.

11. An electronic device comprising:
one or more processors coupled to a user interface component and a connection component; and
a computer-readable storage medium containing instructions, that, when executed by the one or more processors, cause the one or more processors to perform actions including:
detecting, at each of a set of time points, execution of an application at the electronic device;
determining, for each detected execution, an application-usage variable, wherein the application-usage variable is a temporal characteristic of application usage;
generating, for each session of the electronic device, one or more aggregated metrics for the session of the electronic device based on aggregation of at least some of the application-usage variables generated during the session of the electronic device, thereby generating a plurality of aggregated metrics, wherein a session of the electronic device is a time period between an unlock event and a subsequent lock event, and wherein each aggregated metric of the plurality of aggregated metrics is associated with a session identifier of a plurality of session identifiers;
assigning each of the plurality of aggregated metrics to a cluster of a plurality of clusters;
determining, based on numbers of sessions assigned to each of the clusters associated with the plurality of session identifiers, a state identifier corresponding to an inferred cognitive state of a user of the electronic device;
retrieving a device-operation identifier associated with the state identifier; and
performing a device operation associated with the device-operation identifier.

12. The electronic device of claim 11, wherein:
a first subset of the set of time points were during a first use session of the electronic device;
a second subset of the set of time points were during a second use session of the electronic device;
the electronic device was in a locked state for at least part of a time period between the first use session and the second use session; and generating the one or more aggregated includes:
generating a first aggregated metric of the one or more aggregated metrics based on aggregation of a first subset of the application-usage variables corresponding to the first use session; and
generating a second aggregated metric of the one or more aggregated metrics based on aggregation of a second subset of the application-usage variables corresponding to the first use session.

13. The electronic device of claim 11, wherein:
the one or more aggregated metrics includes a plurality of aggregated metrics, each of the plurality of aggregated metrics being associated with a use session of a plurality of use sessions; and
determining the state identifier includes:
assigning each of the plurality of aggregated metrics to a cluster of a plurality of clusters; and
determining the state identifier based on the cluster assignments.

14. The electronic device of claim 11, wherein:
each determined application-usage variable includes an identifier of a particular application that was executed; and
generating the one or more aggregated metrics includes:
generating a data object that includes a set of particular applications and that indicates an order in which the set of particular applications were executed;
embedding the data object; and
generating an aggregated metric based on the embedded data object, the aggregated metric having a reduced dimensionality as compared to a dimensionality of the embedded data object.

15. A computer-program product tangibly embodied in a non-transitory machine-readable storage medium, including instructions configured to cause one or more data processors to perform actions including:
detecting, at each of a set of time points, execution of an application at an electronic device;
determining, for each detected execution, an application-usage variable, wherein the application-usage variable is a temporal characteristic of application usage;
generating, for each session of the electronic device, one or more aggregated metrics for the session of the electronic device based on aggregation of at least some of the application-usage variables generated during the session of the electronic device, thereby generating a plurality of aggregated metrics, wherein a session of the electronic device is a time period between an unlock event and a subsequent lock event, and wherein each aggregated metric of the plurality of aggregated metrics is associated with a session identifier of a plurality of session identifiers;
assigning each of the plurality of aggregated metrics to a cluster of a plurality of clusters;
determining, based on numbers of sessions assigned to each of the clusters associated with the plurality of session identifiers, a state identifier corresponding to an inferred cognitive state of a user of the electronic device;
retrieving a device-operation identifier associated with the state identifier; and
performing a device operation associated with the device-operation identifier.

16. The computer-program product of claim 15, wherein:
a first subset of the set of time points were during a first use session of the electronic device;

a second subset of the set of time points were during a second use session of the electronic device;

the electronic device was in a locked state for at least part of a time period between the first use session and the second use session; and generating the one or more aggregated includes:

generating a first aggregated metric of the one or more aggregated metrics based on aggregation of a first subset of the application-usage variables corresponding to the first use session; and generating a second aggregated metric of the one or more aggregated metrics based on aggregation of a second subset of the application-usage variables corresponding to the first use session.

17. The computer-program product of claim 15, wherein:

the one or more aggregated metrics includes a plurality of aggregated metrics, each of the plurality of aggregated metrics being associated with a use session of a plurality of use sessions; and determining the state identifier includes:

assigning each of the plurality of aggregated metrics to a cluster of a plurality of clusters; and determining the state identifier based on the cluster assignments.

* * * * *